US006853976B2

(12) United States Patent
Tanaka

(10) Patent No.: US 6,853,976 B2
(45) Date of Patent: Feb. 8, 2005

(54) FOOD AND DRINK SERVING SYSTEM FOR EATING AND DRINKING PLACE

(75) Inventor: Kunihiko Tanaka, Osaka (JP)

(73) Assignee: Kura Corporation Ltd., Osaka (JP)

( * ) Notice: Subject to any disclaimer, the term of this patent is extended or adjusted under 35 U.S.C. 154(b) by 429 days.

(21) Appl. No.: 09/870,545

(22) Filed: May 30, 2001

(65) Prior Publication Data

US 2002/0002493 A1 Jan. 3, 2002

(30) Foreign Application Priority Data

May 31, 2000 (JP) ........................................ 2000-162099

(51) Int. Cl.[7] .............................................. G06E 17/60
(52) U.S. Cl. ........................................ 705/15; 705/14
(58) Field of Search .............................. 705/15, 16, 14; 235/7

(56) References Cited

U.S. PATENT DOCUMENTS

| | | | | | |
|---|---|---|---|---|---|
| 2,489,732 | A | * | 11/1949 | Trimble ........................ | 186/39 |
| 2,640,581 | A | * | 6/1953 | Abitz ........................... | 198/38 |
| 4,415,065 | A | * | 11/1983 | Sandstedt ..................... | 186/39 |
| 4,530,067 | A | * | 7/1985 | Dorr ............................ | 364/900 |
| 4,800,438 | A | * | 1/1989 | Yuter ........................... | 358/254 |
| 4,803,917 | A | * | 2/1989 | Barbieri ....................... | 99/356 |
| 5,218,527 | A | * | 6/1993 | Ishikawa et al. ............. | 364/405 |
| 5,235,509 | A | * | 8/1993 | Mueller et al. .............. | 364/405 |
| 5,262,938 | A | * | 11/1993 | Rapoport et al. ............ | 364/401 |
| 5,347,917 | A | * | 9/1994 | Vezzani ........................ | 99/335 |
| 5,377,097 | A | * | 12/1994 | Fuyama et al. .............. | 364/401 |
| 5,651,775 | A | * | 7/1997 | Walker et al. ............... | 604/207 |
| 6,088,681 | A | * | 7/2000 | Coleman et al. ............. | 708/15 |

FOREIGN PATENT DOCUMENTS

FR 2758637 * 7/1998

OTHER PUBLICATIONS

Rosen, "Transfdorming Travel" Informationweek, n 792, pp50–64, Jun. 2000.*

* cited by examiner

*Primary Examiner*—Joseph A. Fischetti
(74) *Attorney, Agent, or Firm*—Frishauf, Holtz, Goodman & Chick, P.C.

(57) ABSTRACT

A food and drink serving system for an eating and drinking place includes reading units, arranged in customers' tables, respectively, for reading order identifying information of meal tickets of customers, transmitting means for transmitting cooking information including the order identifying information read by the reading unit and a seat number identifying information on the table in which the reading unit is arranged, and cooking information informing means for informing at least either of a cook and a cooking director of at least the order identifying information and the seat number identifying information of the cooking information transmitted by the transmitting means.

7 Claims, 5 Drawing Sheets

Fig. 6

| | | | |
|---|---|---|---|
| Curry and Rice | 01 | | |
| Spaghetti | 02 | 03 | 03 |
| Steak | 01 | | |
| Ramen | 05 | 05 | 02 |
| Kitsune Udon | 06 | 06 | |
| Tenpura Udon | 05 | | |
| Tanuki Soba | 05 | | |
| Tenpura Soba | 04 | 03 | 06 |
| Curried Udon | 04 | 03 | 06 |

FOOD AND DRINK SERVING SYSTEM FOR EATING AND DRINKING PLACE

BACKGROUND OF THE INVENTION

1. Field of the Invention

The present invention relates to a food and drink serving system for an eating and drinking place.

2. Prior Art

In eating and drinking places adopting a meal ticket system, a customer gets a meal ticket at a ticket counter or from a slot vending machine, first, and then takes an empty seat. Then, a waiter comes to the customer and confirms his/her order from the ticket and then carries or sends the contents and, if necessary, information on the customer's seat number (table number), to a cooking place. The waiter ordinarily receives the customers' order on a first-come-first-serve basis.

However, when customers come in flocks simultaneously, even when the waiter tries to take their orders on a first-come-first-served basis, he/she sometimes cannot help but receive an order from a customer who comes after, first, depending on the positional relation between the waiter and the customers' tables. In this case, a customer who comes first is kept waiting for giving his/her order to the waiter and thus waiting a long for his/her ordered food or drink, and sometimes feels dissatisfied.

For shortening the waiting time, it may be a conceivable way that the order is sent to the cooking place at a point in time when the meal ticket is issued, but this has a problem that it cannot be seen which seat the customer took.

SUMMARY OF THE INVENTION

In consideration of this problem, the present invention has been made. It is the object of the present invention to provide a food and drink serving system in an eating and drinking place capable of sending the customers' orders to the cooking place according to the seating order and serving the ordered food and drink to the customer in a shortest possible time, not to keep the customer wait for a long time.

To accomplish the object noted above, a food and drink serving system for an eating and drinking place according to the present invention comprises reading units, arranged in customers' tables, respectively, for reading order identifying information of meal tickets of customers, transmitting means for transmitting cooking information including the order identifying information read by the reading unit and a seat number identifying information on the table in which the reading unit is arranged, and cooking information informing means for informing at least either of a cook and a cooking director of at least the order identifying information and the seat number identifying information of the cooking information transmitted by the transmitting means.

The food and drink serving system for an eating and drinking place according to the present invention further includes a food and drink containing tableware or a carrier container which is provided with identifying information imparting means for imparting the seat number identifying information.

A food and drink serving system for an eating and drinking place according to the present invention comprises reading units, arranged in customers' tables, respectively, for reading order identifying information of meal tickets of customers, transmitting means for transmitting cooking information including the order identifying information read by the reading unit and a seat number identifying information on the table in which the reading unit is arranged, an automatic cooking unit for automatically cooking an ordered food and drink in accordance with the order identifying information of the cooking information transmitted by the transmitting means, and a seat number identifying information imparting means for imparting the seat number identifying information to an automatically-cooked-food-and-drink containing tableware or a carrier container in accordance with the seat number identifying information of the cooking information transmitted by the transmitting means.

In the food and drink serving system for an eating and drinking place according to the present invention, there is provided an automatic conveying means for putting the cooked food thereon and conveying it from a cooking place to the seat associated with the seat number identifying information.

It is preferable that the food and drink serving system for the eating and drinking place according to the present invention further includes an automatic conveying means which is provided with a guide means for announcing an arrival of the food and drink to the customer when the food is arrived at the seat associated with the seat number identifying information.

It is preferable that the food and drink serving system for the eating and drinking place according to the present invention includes an automatic meal ticket dispenser which is provided with a transmitting means for transmitting the order identifying information of the meal ticket the customer purchased to the cooking information informing means or an automatic cooking unit.

The food and drink serving system for the eating and drinking place according to the present invention thus constructed can provide the results that the orders can be sent to the cooking place according to the seating order and that the food and drink ordered by the customer can be served in a shortest possible time without keeping the customer wait.

BRIEF DESCRIPTION OF THE DRAWINGS

In the drawings:

FIG. 6 is a front view of a display panel.

DETAILED DESCRIPTION OF THE PREFERRED EMBODIMENTS

In the following, the present invention will be described in detail with reference to the accompanying drawings. FIGS. 1–6 show a food and drink serving system of a preferred embodiment of the present invention.

Figure 1:
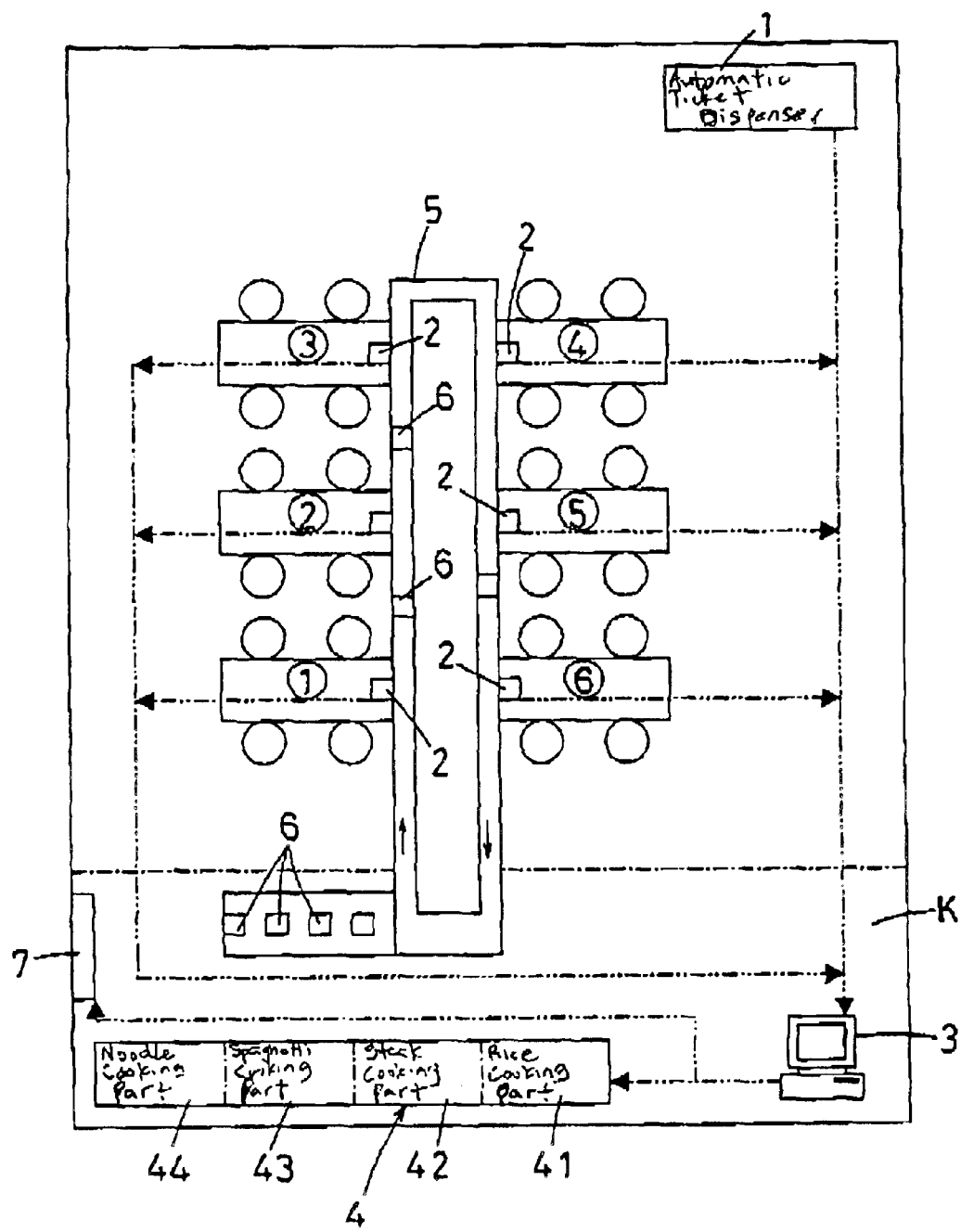
FIG. 1 is a schematic diagram of a food and drink serving system in an eating and drinking system for a preferred embodiment according to the present invention.
Figure 2:
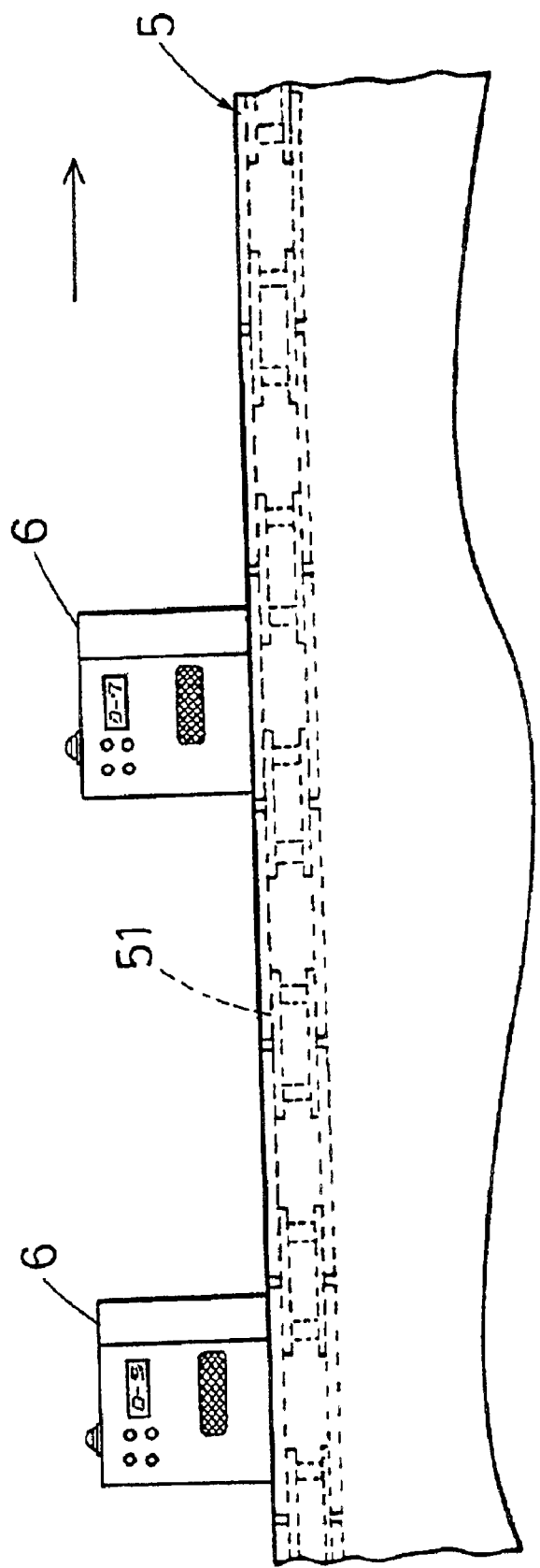
FIG. 2 is a side view of a conveying path of the food and drink serving system of FIG. 1.

As shown in FIG. 1, the food and drink serving system comprises an automatic ticket dispenser 1, meal ticket reading units 2, a computing means 3, an automatic cooking unit 4, a conveying path 5 forming an automatic conveying means, carrier containers 6, and a display panel 7 forming a cooking information notice means.

The automatic ticket dispenser 1 is structured as follows, though not shown. When a customer puts coin or paper money in the dispenser 1 from a coin slot or a paper money slot and then presses a button for choice of a wanted food and drink, the dispenser 1 delivers therefrom a ticket with the ordered item name printed on the front side thereof and the kind of the ordered item stored as magnetic data in a magnetic storage media on the back side of the ticket and also transmits the order identifying information and the ticket purchase time to the computing means 3 through a built-in transmitting means (not shown).

The conveying path 5 is arranged in loop to pass from the cooking place K where the automatic cooking unit 4 mentioned later is located to the cooking place K through all tables ①–⑥. The conveying path 5 comprises a conveyor 51 that conveys the carrier container 6 for containing the food and drink F mentioned later, as shown in FIGS. 2–5.

The tables ①–⑥ arranged alongside the conveying path 5 are fixedly provided with the meal ticket reading units 2, respectively. Each reading unit 2 is provided with a meal ticket inlet and outlet and a built-in seat number identifying signal transmitter. The seat number identifying signal transmitter is so structured that it always transmits signals, different in frequency for each table, within the range of about 3 meters around each table (①②, ③, ④, ⑤, or ⑥).

When the meal ticket is dropped in the meal ticket slot of the reading unit 2, the reading unit 2 reads the order identifying information, first, and then transmits it to the computing means 3, together with the information on the seat number of the table (①②, ③, ④, ⑤, or ⑥) on which the related reading unit 2 is placed. Thereafter, the ticket is withdrawn.

On the basis of the order identifying information sent from the automatic ticket dispenser 1, the computing means 3 transmits cooking start signals on the food to be cooked to the automatic cooking unit 4. Also, when the computing means 3 receives the order identifying information and the seat number information from the reading unit 2, it transmits them to the display panel 7.

The automatic cooking unit 4 comprises a noodle cooking part 41, a spaghetti cooking part 42, a steak cooking part 43 and a curry and rice cooking part 44. The automatic cooking unit 4 is so structured that when receiving the cooking start signals from the computing means 3, it can automatically cook on a first-ordered-first-cooked basis, as mentioned below.

Take the noodle cooking part 41, for instance. Though not shown, when the order of noodle, such as udon (Japanese wheat noodle), soba (buckwheat noodle) and ramen (Chinese noodle), is received, a porcelain bowl is taken out from piled porcelain bowls in the automatic cooking unit 4, first, and then is set in a predetermined cooking position. Thereafter, the noodle cooked by heating such as the boiled noodle, relishes such as chopped leek and processed-bamboo shoots, ingredients such as fried beancurd, sliced fish sausage, tenpura (Japanese fried food), char siu, and soup are put and poured in sequence in the porcelain bowl according to the order. Then, the bowl of the noodle thus cooked is brought out from an outlet of the noodle cooking part.

Turning to the spaghetti cooking part 42, though not shown, when the order is received, a dish is taken out from piled dishes in the automatic cooking unit 4, first, and then is set in a predetermined cooking position. Then, boiled spaghetti is scalloped on a hot plate and then the spaghetti thus scalloped is dished up. Then, after a meat sauce or a like source is put on the spaghetti, the dished up spaghetti is brought out from the outlet.

Turning now to the steak cooking part 43, though not shown, when the order is received, a dish is taken out from piled dishes in the automatic cooking unit 4, first, and then is set in a predetermined cooking position. Then, a steak seasoned by salt and pepper is put on a heated hot plate and then another heated hot plate is pressed on the steak so that the steak is grilled from both upper and lower sides. The steak thus gripped is moved from the hot plate to the dish and thereafter the steak put in the dish is brought out from the outlet.

Turning further to curry and rice cooking part 44, though not shown, when the order is received, a curry dish is taken out from piled curry dishes in the automatic cooking unit 4, first, and then is set in a predetermined cooking position. Then, rice is put on the curry dish and further curry roux is poured thereon. The curry and rice put in the curry dish is brought out from the outlet.

The display panel 7 is placed at a proper position within the sight of a person who makes a tray service or a waiter in the cooking place. As shown in FIG. 6, all items served are vertically listed one for each row on the display panel 7 at the left side thereof, and a plurality of photoelectric display parts 71 are provided alongside of the items listed on the panel. When the order identifying information and the information on the seat number are transmitted to the display panel 7 from the computing means 3, the seat number of the customer's table is photo-electrically displayed on the photoelectric display part at the leftmost side of the photoelectric display parts 71 at which light is not yet put in. Then, when the information on the seat number and the item conveyed are transmitted to the display panel 7 by pressing a target setting button 62c of the carrier container 6, as will be mentioned later, the seat number displayed on the related photoelectric display part 71 to that item is lighted out. Every time when the seat number display on the left side of the photoelectric display part 71 is lighted out, the seat number display on the right side thereof is shifted to the left side one by one.

Figure 3:
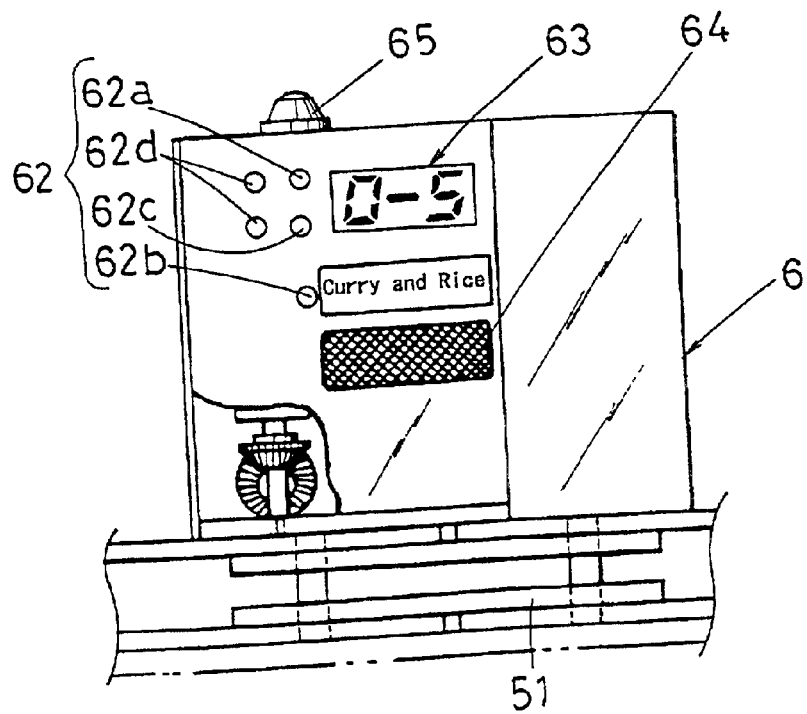
FIG. 3 is a partly cut sectional view of a principal part of FIG. 2.
Figure 4:
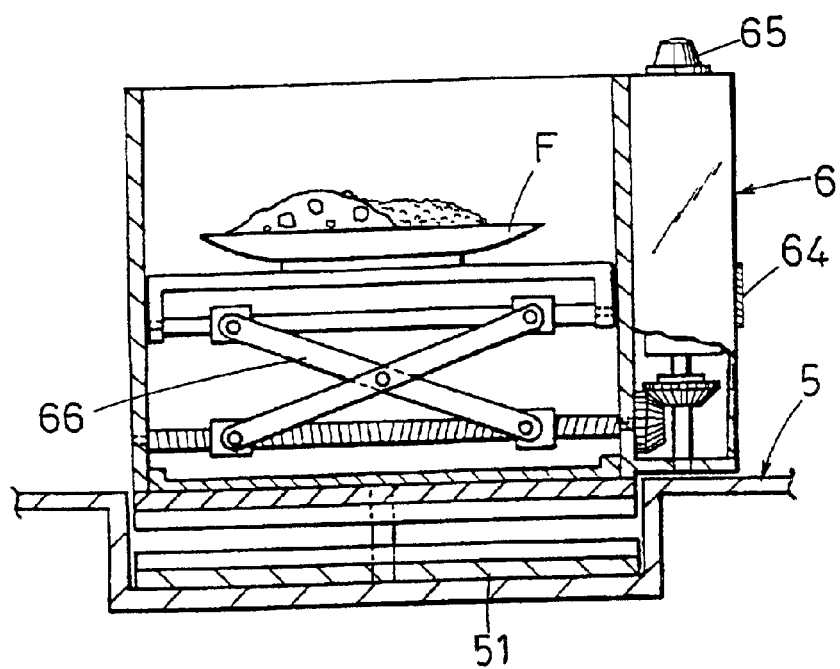
FIG. 4 is a sectional view showing the state in which a plate is retracted in a retracting portion of the conveying container placed on the conveying path of the food and drink serving system.
Figure 5:
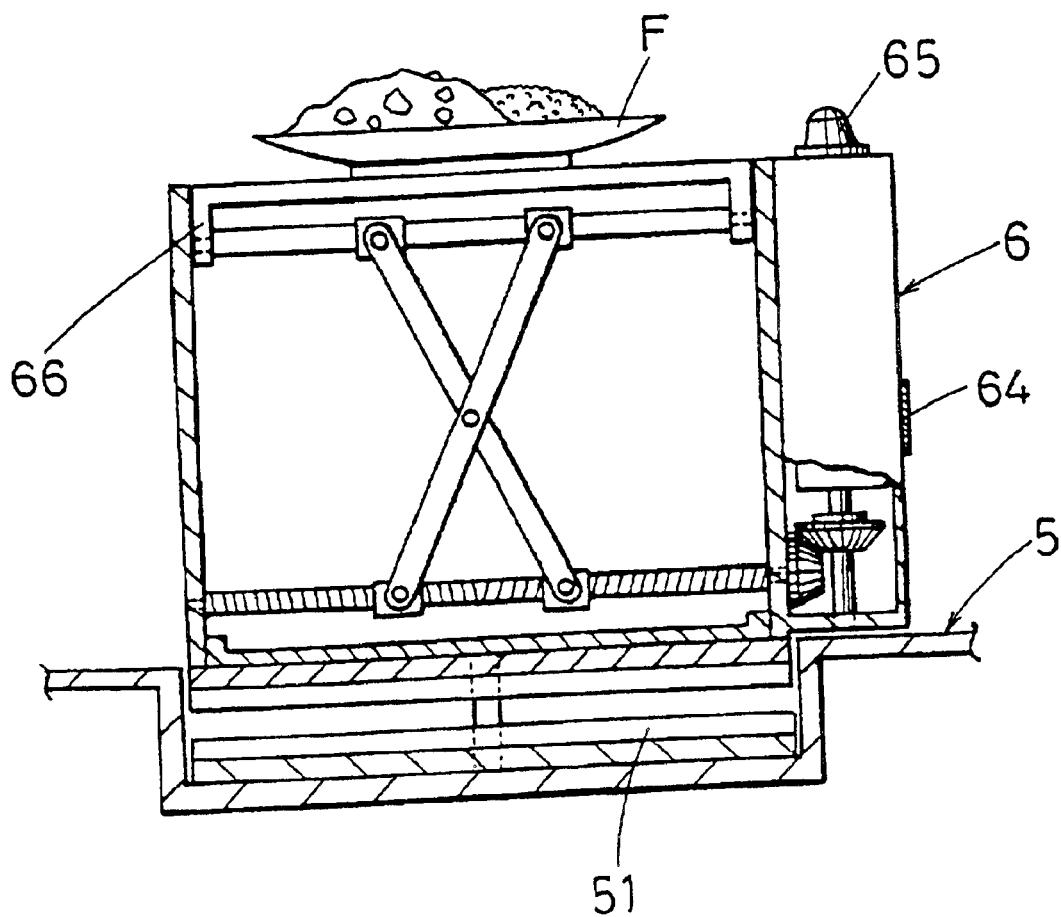
FIG. 5 is a sectional view showing the state in which the dish is exposed from the retracting portion of the conveying container of FIG. 4.

The carrier container 6 has a box-like casing opening at the top, as shown in FIGS. 3–5. The casing is provided, at the outside thereof, with an operating portion 62, a liquid crystal display part 63, a speaker 64 formed as a guiding means and a lamp 65 formed as a guiding means and is capable of housing the food and drink F in the interior thereof. The carrier container 6 is provided with a lift 66 vertically movable with the food and drink on, a receiver (not shown) for receiving the identifying signals from the seat number identifying signal transmitter, and a sender (not shown).

The operating portion 62 includes a target seat setting dial 62a for setting a targeted seat for the food and drink to be conveyed, a target food and drink setting dial 62b, the target setting button 62c and an operating button 62d for lifting operation of the lift 66.

The target seat setting dial 62a is a rotary dial that can provide the display of any targeted seat number on the liquid crystal display part 63 by revolving.

The target food and drink setting dial 62b is also a rotary dial that can provide the display of any targeted food and drink on the liquid crystal display part 63 by revolving.

The target setting button 62c can be set so that when the button 62c is pressed after the targeted seat number and the targeted food and drink are displayed on the liquid crystal display part 63, the receiver loaded in the carrier container 6 can receive the seat number identifying signals transmitted from the seat number identifying signal transmitter displayed.

The speaker 64 is so structured as to aurally announce the arrival of the ordered food and drink to the customer by voice when the carrier container 6 put on the conveying path 5 comes into the 3 meter range of the targeted seat number displayed on the liquid crystal display part 63 and the receiver receives the seat number identifying signals from the targeted seat.

The lamp 65 is so structured as to visually announce the arrival of the ordered food and drink to the customer by flashing when the carrier container 6 put on the conveying path 5 comes into the 3 meter range of the targeted seat number displayed on the liquid crystal display part 63 and the receiver receives the seat number identifying signals from the targeted seat.

The food and drink serving system of the embodiment of the invention is structured as mentioned above. When a customer purchases a meal ticket from the automatic ticket dispenser 1, the cooking start signals of the ticket are immediately sent to the automatic cooking unit 4 and the automatic cooking unit starts cooking. Then, when the customer takes a seat ①②, ③, ④, ⑤, or ⑥) and the data of the ticket is read by the meal ticket reading unit 2 at that seat, the seat number of the customer ①②, ③, ④, ⑤, or ⑥) is displayed on the display panel 7 at the display parts alongside of the items listed on the display panel 7 according to the order according to which the food and drink written on the ticket is read.

Then, when the cooked food and drink is brought out from the outlet of the automatic cooking unit 4, the person who makes a tray service puts the cooked food on the lift of the carrier container 6 put in its raised position and then operates the operating button 62d to lower the lift 66, so as to house the cooked food in the interior of the casing.

Then, the seating number displayed on the display part of the display panel 7 alongside of the items listed on the display panel 7 at the leftmost side thereof and the item name are displayed on the liquid crystal display part 63. Thereafter, the target setting button 62c is pressed to set the target and then the carrier container 5 is put on the conveying path 5.

When the carrier container 6 comes into the 3 meter range of the targeted seat ①②, ③, ④, ⑤, or ⑥) and the receiver receives the seat number identifying signals from the seat number identifying signal transmitter built in the meal ticket reading unit 2 of the targeted seat ①②, ③, ④, ⑤, or ⑥), the arrival of the ordered food and drink is announced to the customer by the speaker 64 and the lamp 65. The customer takes out the carrier container 6 conveyed to his/her place from the conveying path, first. Then, he/she operates the operating button 62d to move up the lift 66 and thus the ordered food and then takes out the food from the carrier container 6 and eats it.

As seen from the above, according to the food and drink serving system of the invention, at the same time as the customer purchases the meal ticket, the instruction to start cooking is sent to the automatic cooking unit 4. Also, when the customer takes a seat and drops the ticket in the meal ticket reading unit 2 set in that table, the data of the ticket is read by the reading unit 2 and the contents of the order and the seat number of the customer is automatically sent to the cooking place. Thus, the food and drink ordered by the customer can be served in a shortest possible time and in a reliable manner without keeping the customer wait.

The food and drink serving system according to the invention is not limited to the embodiment illustrated above. For example, this system is also applicable to the eating and drinking places such as a sushi shop, in addition to the eating and drinking places adopting the meal ticket system. Specifically, this food and drink serving system can suitably be used, for example, for a revolving food system in which the foods that can taste good eaten cold, such as sushi, are circulated along the conveying path so that the customer takes them at his/her own choice and the bill is paid on a basis of the number of plates, as well as for the meal ticket system in respect of the items that are required to be served within a few minutes after the cook, such as steak, udon (Japanese wheat noodle) and curry and rice.

In the embodiment above, the automatic cooking unit is used to cook the ordered food, but the cook or hasher may of course cook it when the instruction is sent to the display panel 7.

Also, the automatic cooking unit may be made to start cooking at the same time as the customer makes the data of the ticket read by the reading unit, rather than at the same time as the customer purchases the ticket from the automatic ticket dispenser. In the latter case, namely, when the cooking is started at the same time as the customer purchases the ticket from the automatic ticket dispenser, there may arise the problem that when the tables are full occupancy and the customer must be kept for a while, the food cooked cannot be served until the customer takes the seat. In the former case, however, such a problem can be solved because the customer has already taken the seat.

The foods and drinks may be conveyed by other proper conveying means such as a conveying robot, instead of the conveying path.

Further, while in the embodiment above, the ticket is withdrawn after dropping it into the reading unit, modification may be made as follow. At the same time as the date of the ticket is read, the information on the seat number is recorded in the ticket and then the ticket is returned back to the customer for a while. At a point in time when the carrier container or the conveying robot arrives at the customer's seat, the ticket is made to be read again by the reading unit built in the carrier container or conveying robot, for the confirmation purpose. Only when the information on the food and the seat number in the ticket corresponds to that in the reading unit in the carrier container or conveying robot, the customer can take the conveyed food.

What is claimed is:

1. A food and drink serving system or an eating and drinking place comprising:
    a customer-operated automatic meal ticket dispenser, disposed at an order placing location remote from a customer's table, which accepts a customer-initiated order, corresponding to order identifying information, and which dispenses a meal ticket to a customer, the dispenser including first transmitting means for transmitting the order identifying information of the meal ticket to a cooking location at the time the customer purchases the meal ticket from the meal ticket dispenser,
    reading units, arranged at customer tables, respectively, for reading order identifying information of meal tickets of customers, said reading units being operatively coupled to second transmitting means for transmitting cooking information including the order identifying information read by a respective reading unit and a seat number identifying information on the table in which the reading unit is arranged, and cooking information informing means disposed at the cooking location which is remote from the customer table, for receiving the order identifying information transmitted by the first transmitting means and the cooking information transmitted by the second transmitting means, and for informing a cook or a cooking director located at the cooking location of the order identifying information and the seat number identifying information of the cooking information transmitted by the second transmitting means.

2. The food and drink serving system for an eating and drinking place according to claim 1, comprising a food and drink carrier container and identifying information imparting means for imparting the seat number identifying information to the food and drink carrier container.

3. The food and drink serving system for an eating and drinking place according to claim 2, comprising automatic conveying means for putting the cooked food thereon and conveying the cooked food from a food preparation location to the seat associated with the seat number identifying information.

4. The food and drink serving system for an eating and drinking place according to claim 3, wherein the automatic conveying means comprises guide means for announcing an arrival of ordered food and drink to the customer when the food and drink arrives at the seat associated with the seat number identifying information.

5. The food and drink serving system for an eating and drinking place according to claim 1, wherein the customer initiated order is provided to the dispenser prior to the customer being seated in the eating and drinking place.

6. The food and drink serving system for an eating and drinking place according to claim 1, wherein the customer initiated order is transmitted by the first transmitting means prior to the customer being seated in the eating and drinking place.

7. The food and drink serving system for an eating and drinking place according to claim 1, wherein the automatic meal ticket dispenser is configured to accept payment from the customer proximate the time that the customer-initiated order is provided to the dispenser.

* * * * *